United States Patent
Elisha et al.

(10) Patent No.: US 11,514,364 B2
(45) Date of Patent: Nov. 29, 2022

(54) ITERATIVE VECTORING FOR CONSTRUCTING DATA DRIVEN MACHINE LEARNING MODELS

(71) Applicant: Microsoft Technology Licensing, LLC, Redmond, WA (US)

(72) Inventors: Oren Elisha, Hertzeliya (IL); Ami Luttwak, Binyamina (IL); Hila Yehuda, Tel Aviv (IL); Adar Kahana, Natanya (IL); Maya Bechler-Speicher, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 410 days.

(21) Appl. No.: 16/795,307

(22) Filed: Feb. 19, 2020

(65) Prior Publication Data
US 2021/0256419 A1    Aug. 19, 2021

(51) Int. Cl.
*G06N 20/00* (2019.01)
*G06Q 30/00* (2012.01)

(52) U.S. Cl.
CPC ........... *G06N 20/00* (2019.01); *G06Q 30/016* (2013.01)

(58) Field of Classification Search
CPC ........ G06N 20/00; G06N 5/048; G06N 20/10; G06N 7/005; G06N 20/20; G06N 3/08; G06N 3/082
See application file for complete search history.

(56) References Cited

U.S. PATENT DOCUMENTS

| 6,751,600 | B1 | 6/2004 | Wolin et al. |
| 8,954,358 | B1 | 2/2015 | Zhang et al. |
| 9,449,283 | B1* | 9/2016 | Purpura .................. G06N 20/00 |
| 11,321,629 | B1 | 5/2022 | Rowan et al. |
| 2017/0075873 | A1 | 3/2017 | Shetty et al. |
| 2017/0161640 | A1* | 6/2017 | Shamir .................. G06N 20/00 |

(Continued)

FOREIGN PATENT DOCUMENTS

CN    106874655 B    12/2018

OTHER PUBLICATIONS

A. Haq et al., "Combining Multiple Feature-Ranking Techniques and Clustering of Variables for Feature Selection," IEEE, published Oct. 16, 2019 (Year: 2019).*

(Continued)

*Primary Examiner* — Eric J Yoon
(74) *Attorney, Agent, or Firm* — Fiala & Weaver P.L.L.C.

(57) ABSTRACT

Embodiments described herein are directed to generating a machine learning (ML) model. A plurality of vectors are accessed, each vector of the plurality of vectors including a first set of features associated with a corresponding data item. A second set of features is identified by expanding the first set of features. A ML model is trained using vectors including the expanded set of features, and it is determined that an accuracy of the ML model trained using the vectors increased. A third set of features is identified by determining a measure of importance for different subsets of features in the second set and replacing subsets having a low measure of importance with new features. A ML model is trained using vectors that include the third set, and it is determined that an accuracy of the model increased due to the replacing.

20 Claims, 5 Drawing Sheets

(56) References Cited

U.S. PATENT DOCUMENTS

| | | | |
|---|---|---|---|
| 2018/0114142 A1 | 4/2018 | Mueller | |
| 2018/0240031 A1 | 8/2018 | Huszar et al. | |
| 2018/0336362 A1 | 11/2018 | Guttmann | |
| 2019/0004920 A1 | 1/2019 | Vandriessche et al. | |
| 2019/0244348 A1 | 8/2019 | Buckler et al. | |
| 2020/0019884 A1 | 1/2020 | McCourt, Jr. | |
| 2020/0034665 A1 | 1/2020 | Ghanta et al. | |
| 2020/0118036 A1* | 4/2020 | Karnagel | G06N 3/084 |
| 2020/0250270 A1* | 8/2020 | Yu | G06F 40/126 |
| 2020/0257970 A1 | 8/2020 | Moon et al. | |
| 2020/0302340 A1 | 9/2020 | Durand et al. | |
| 2020/0320440 A1 | 10/2020 | Ashani et al. | |
| 2020/0349434 A1 | 11/2020 | Zhang et al. | |
| 2021/0232966 A1 | 7/2021 | Elisha et al. | |
| 2021/0249135 A1 | 8/2021 | Rimestad et al. | |
| 2021/0256420 A1 | 8/2021 | Elisha et al. | |

OTHER PUBLICATIONS

"International Search Report and Written Opinion Issued in PCT Application No. PCT/US21/014061", dated Apr. 23, 2021, 13 Pages.

"Confusion Matrix", Retrieved From: https://en.wikipedia.org/w/index.php?title=Confusion_matrix&oldid=935615638, Jan. 13, 2020, 4 Pages.

"International Search Report and Written Opinion Issued in PCT Application No. PCT/US20/066728", dated Mar. 29, 2021, 14 Pages.

Kassani, et al., "k-Relevance Vectors: Considering Relevancy Beside Nearness", In The Repository of arXiv:1909.08528, Sep. 18, 2019, 20 Pages.

Khurana, Udayan, "Automating Feature Engineering in Supervised Learning", Retrieved from: https://udayankhurana.com/wp-content/uploads/2018/07/FEbook-Chapter9.pdf, Mar. 14, 2018, pp. 115-137.

"International Search Report and Written Opinion Issued in PCT Application No. PCT/US21/014249", dated May 6, 2021, 13 Pages.

"Non Final Office Action Issued in U.S. Appl. No. 16/773,153", dated May 20, 2022, 21 Pages.

"Non Final Office Action Issued in U.S. Appl. No. 16/795,353", dated Jun. 15, 2022, 10 Pages.

Hijawi, et al., "EMFET: E-mail Features Extraction Tool", In Repository of arXiv:1711.08521, Nov. 22, 2017, 7 Pages.

"Predictive Intelligence", Retrieved From: https://www.servicenow.com/products/predictive-intelligence.html, Retrieved On: Jan. 7, 2020, 7 Pages.

Devlin, et al., "BERT: Pre-training of Deep Bidirectional Transformers for Language Understanding", In Repository of arXiv:1810.04805v1, Oct. 11, 2018, 14 Pages.

Miyato, et al., "Adversarial Training Methods for Semi-Supervised Text Classification", In Proceedings of 5th International Conference on Learning Representations, Apr. 24, 2017, 11 Pages.

Sallab, et al., "E-mail Classification Using Deep Networks", In Journal of Theoretical and Applied Information Technology, vol. 37, No. 2, Mar. 31, 2012, pp. 241-251.

Yang, et al., "XLNet: Generalized Autoregressive Pretraining for Language Understanding", In Repository of arXiv:1906.08237v1, Jun. 19, 2019, 18 Pages.

"Notice of Allowance Issued in U.S. Appl. No. 16/795,353", dated Sep. 22, 2022, 13 Pages.

\* cited by examiner

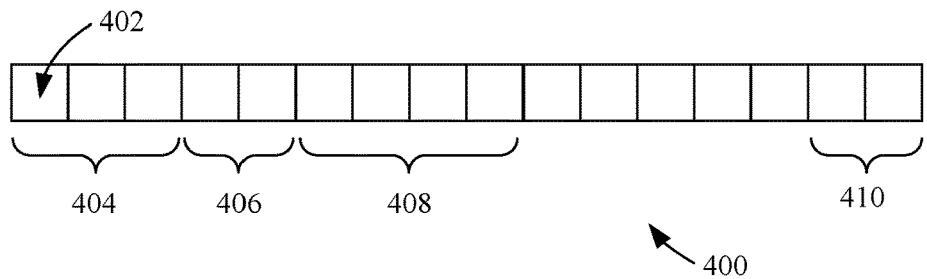

| Remove subsets of features having a measure of importance that does not meet a threshold, thereby removing a particular number of features from the vectors | 502 |

↓

| Expand one or more subsets of features in the vectors having a measure of importance that does meet the threshold, the total amount of features added to the vectors by virtue of the expanding is equal to the particular number of features that were removed | 504 |

| Identify the second set of features in an iterative manner until the accuracy of a trained ML model does not improve compared to an accuracy of a prior iteration. | 602 |

| Identify the third set of features in an iterative manner until at least one of a predetermined number of iterations has occurred, or a desired accuracy criteria has been satisfied. | 702 |

FIG. 7

ITERATIVE VECTORING FOR CONSTRUCTING DATA DRIVEN MACHINE LEARNING MODELS

BACKGROUND

Advances in computing have led to the recent usage in machine learning to automate many tasks. Machine learning (ML) has proven itself in multiple consumer applications such as web ranking and recommendation systems. In the context of enterprise scenarios, ML is emerging as a compelling tool in a broad range of applications such as marketing/sales optimization, process automation, preventative healthcare, predictive maintenance, cybersecurity, fraud detection, among other things.

Many software applications (e.g., e-mail applications, information technology (IT) ticketing applications, customer relationship management (CRM) applications) use unique taxonomies (or labels) for categorizing data based on their own respective unique processes. In some instances, categorization of new data can be carried out with ML techniques. Such techniques require transforming the new data into numerical vectors that can be used by ML algorithms for building predictive models. However, the vector representation is typically fixed based on pre-defined algorithms. As a result of the fixed vector representation, training a ML model to accurately categorize new data can be hindered, leading to an overall performance decrease of the predictive model.

Even further, because many conventional vector representations are based on pre-defined algorithms, many of the features that are included in the vector representations may be insignificant in terms of predictive power. Even though such features may be insignificant, they are still included in the vector representations used to train a ML model, thereby consuming additional storage resources in order to store the features as part of the vector representations. Inclusion of these unimportant features in the vector representations may also lead to increased consumption in processing resources, as those features need to be loaded and analyzed to train the ML model. Even with an increase in the storage and consumption resources, the model accuracy may not improve due to the lack of importance of those features.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for generating a machine learning (ML) model. For instance, as will be described herein, a plurality of vectors are accessed. Each vector of the plurality of vectors includes a first set of features associated with a corresponding data item (e.g., an email, a ticket, a CRM message, etc.). A second set of features is identified from the first set of features. For example, the first set of features included in each vector is expanded. A ML model is trained using vectors including the expanded set of features, and it is determined that an accuracy of the ML model trained using the vectors has increased. A third set of features is also identified. The third set of features is identified, for example, by at least determining a measure of importance for different subsets of features in the second set of features and identifying subsets of features having a measure of importance that does not meet a threshold. For such subsets of features that do not meet the threshold, the subsets are replaced with new features. An accuracy of a ML model trained using the vectors including the new features is determined to have increased due to the replacing. A ML model trained using the third set of features is then outputted. In this manner, the set of features used for training a ML model is modified by, among other things, allocating more features to ML algorithms with higher measures of importance, thereby improving the overall accuracy of the ML model.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows a diagram illustrating a vector comprising a set of features for training a ML model in accordance with an embodiment.

FIG. 5 shows a flowchart of a method for replacing one or more subsets of features in a vector in accordance with an example embodiment.

FIG. 6 shows a flowchart of a method for identifying a second set of features in an iterative manner in accordance with an example embodiment.

FIG. 7 shows a flowchart of a method for identifying a third set of features in an iterative manner in accordance with an example embodiment.

Figure 1:
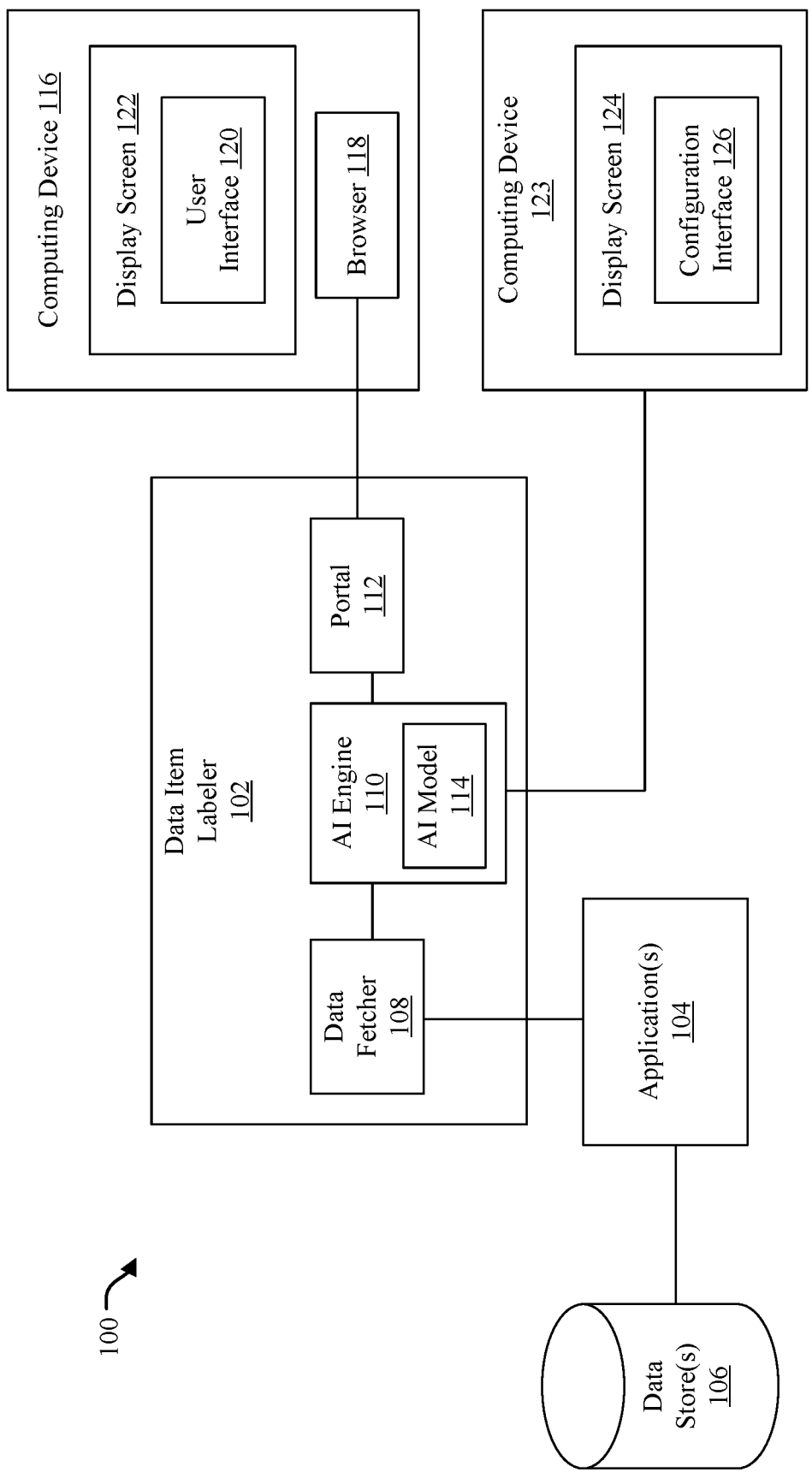
FIG. 1 shows a block diagram of a system for categorizing data items in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to generating a ML model. For instance, as will be described herein, a plurality of vectors is accessed. Each vector of the plurality of vectors includes a first set of features associated with a corresponding data item (e.g., an email, a ticket, a CRM message, etc.). A second set of features is identified from the first set of features. For example, the first set of features included in each vector is expanded. A ML model is trained using vectors including the expanded set of features, and it is determined that an accuracy of the ML model trained using the vectors has increased. A third set of features is also identified. The third set of features is identified, for example, by at least determining a measure of importance for different subsets of features in the second set of features and identifying subsets of features having a measure of importance that does not meet a threshold. For such subsets of features that do not meet the threshold, the subsets are replaced with new features. An accuracy of a ML model trained using the vectors including the new features is determined to have increased due to the replacing. A ML model trained using the third set of features is then outputted. In this manner, the set of features used for training a ML model is modified by, among other things, allocating more features to ML algorithms with higher measures of importance, thereby improving the overall accuracy of the ML model.

The embodiments described herein may advantageously improve the performance of classifier-based ML models. In particular, the labels (or classifications) generated by such models are more accurate, as the feature sets used to train the models are optimized to include features that have higher measures of importance. For instance, techniques described herein enable determining an appropriate vector size budget and selecting an appropriate set of features to include in the vector based at least on accuracy improvement of a ML model trained using the vector. Because the accuracy of the ML model is improved without increasing the vector size beyond the determined vector size budget, the accuracy improvements can be carried out in a manner that conserves system resources. For example, rather than solely expanding a feature set to include additional features, which may result in large feature sets that consume a vast amount of resources, storage resources may be reduced due to removing features that are not useful and replacing those features with other features that are expected to be useful in predicting labels. Furthermore, processing cycles may also be conserved by fixing the vector size during a feature selection stage. In other words, instead of merely adding more features (which may increase the vector size and use more system resources during model training), accuracy in model training is achieved by, among other things, selecting the most useful features to include in a vector with a determined budget.

Further, improving the accuracy of a classifier-based ML models advantageously improves the functioning of computing devices on which such models are being executed. In particular, training models using optimized sets of features advantageously reduces consumption of processing resources of the computing devices, as the ML model is not unnecessarily wasting valuable processing cycles analyzing features that are not useful in predicting labels or classifications. Instead, since the ML model is trained using features that are useful in terms of predicting labels or classifications, a more efficient use of processing resources is achieved, while also improving accuracy of the predictions. Moreover, the storage requirement of such computing devices is also reduced, as features that are deemed not to be important are no longer needed to be included in vectors during the training and prediction stages.

Additionally, the applications in which such models are implemented also perform more efficiently. For example, if a user attempts to locate data based on labels generated by such a model, the processing burden placed on the application is reduced, as the improved accuracy during training will reduce the number of inaccurately labeled items, resulting in a more efficient search.

Moreover, any technological field in which such models are utilized are also improved. For instance, consider a scenario in which a classifier-based ML model is used in an industrial process, such as predictive maintenance. The possibility of being able to predict disruptions to the production line in advance of that disruption taking place is invaluable to the manufacturer. It allows the manager to schedule the downtime at the most advantageous time and eliminate unscheduled downtime. Unscheduled downtime hits the profit margin hard and also can result in the loss of the customer base. It also disrupts the supply chain, causing the carrying of excess stock. A poorly-functioning classifier-based ML model would improperly predict disruptions, and therefore, would inadvertently cause undesired downtimes that disrupt the supply chain.

Consider another scenario in which a classifier-based ML model is used for cybersecurity. The model would predict whether code executing on a computing system is malicious and automatically cause remedial action to occur. A poorly-functioning classifier-based ML model may mistakenly misclassify malicious code, thereby causing the code to comprise the system.

Consider yet another scenario in which a classifier-based ML model is used for autonomous (i.e., self-driving vehicles). Autonomous vehicles can get into many different situations on the road. If drivers are going to entrust their lives to self-driving cars, they need to be sure that these cars will be ready for any situation. What's more, a vehicle should react to these situations better than a human driver would. A vehicle cannot be limited to handling a few basic scenarios. A vehicle has to learn and adapt to the ever-changing behavior of other vehicles around it. ML algorithms make autonomous vehicles capable of making decisions in real time. This increases safety and trust in autonomous cars. A poorly-functioning classifier-based ML model may misclassify a particular situation in which the vehicle is in, thereby jeopardizing the safety of passengers of the vehicle.

Consider a further scenario in which a classifier-based ML model is used in biotechnology for predicting a patient's vitals or whether a patient has a disease. A poorly-functioning classifier-based ML model may misclassify the vitals and/or the disease. In such a case, the patient may not receive necessary treatment.

These examples are just a small sampling of technologies that would be improved with more accurate classifier-based ML models.

FIG. 1 shows a block diagram of a system 100 for categorizing data items in accordance with an embodiment. As shown in FIG. 1, system 100 includes a data item labeler 102, one or more application(s) 104, one or more data store(s) 106, a computing device 116, and a computing device 123. Data item labeler 102 comprises a data fetcher 108, an artificial intelligence (AI) engine 110, and a portal 112. Each of application(s) 104 is coupled to a respective data store of data stores(s) 106. Each of data store(s) 106 may comprise one or more databases or other storage devices. Examples of application(s) 104 include but are not limited to an e-mail application (e.g., Microsoft Outlook™), a customer relationship management (CRM) application (e.g., Microsoft Dynamics 365™), an information technology (IT) ticketing application, etc. Data store(s) 106 is configured to store data items associated with application(s) 104 (e.g., e-mails, IT ticketing messages, sales information, banking data, marketing data, social media data, etc.).

Data item labeler 102 is configured to automatically label data items for a particular user. The data items may be labeled based at least on analyzing previously-received data items having user-generated labels. For instance, data fetcher 108 is configured to retrieve data items from data store(s) 106 via application(s) 104. In an embodiment, data fetcher 108 provides a request to application(s) 104 for the data items. In another embodiment, data fetcher 108 retrieves the data items directly from data store(s) 106. The retrieved data items are provided to AI engine 110

AI engine 110 is configured to extract various pieces of information (or features) from each of the data items. The information is analyzed to determine patterns and aggregated aspects that are similar between a plurality of different data items. For example, common textual patterns (i.e., templates) and key phrases from various channels (e.g., fields) of the data items are determined. Examples of channels from which features are extracted include but are not limited to, a sender address channel, a timestamp channel, textual channels (e.g., a subject channel, a body channel, a description channel, etc.), platform (or application)-specific channels, etc.

Examples of features that are extracted from a sender or recipient address channel include, but are not limited to, the most frequent senders or recipients (which may be stored in a descending way and cutoff with a parameter for the "top senders" that are saved to a list), each sender's and/or recipient's frequency, affiliations of a sender or recipient, such as @microsoft.com, @gmail.com, etc. (which may similarly be stored in a descending way and cutoff with a parameter for the "top affiliations" that are saved to a list), whether a message is sent from or received by one of the top senders or recipients (or top affiliations), etc. Examples of feature that are extracted from a time stamp channel include, but are not limited to, the arrival time of messages, which may be used to build a histogram of the volume of messages, the day of arrival of a message, whether the message was sent or received during working hours, features generated from a time histogram based on a message arrival time, etc. Examples of features that are extracted from textual channels include, but are not limited, repeating textual patterns (e.g., templates), key phrases that appear frequently in the textual channels, frequencies of words and/or characters in the textual channels (e.g., using principal component analysis (PCA) to build an eigenspace representation of a term frequency-inverse document frequency (TF-IDF) matrix to generate a message representation, using PCA on the transpose of the TF-IDF matrix to generate a word representation), text embeddings in the eigenspace, a sentiment of the message, etc. Examples of features that are extracted from platform specific channels include, but are not limited to, the percentage of replied messages, an average people on a message thread, whether the message has an attachment, whether the message has a high-importance notification, etc.

After the information from the retrieved data items is extracted, AI engine 110 trains a classifier-based AI model 114 that is configured to automatically classify any given data item (e.g., newly-received data items from application(s) 104) based on the extracted information, such as by predicting a category or a label for the data item. AI model 114 may be trained based at least on a subset of data items having predetermined labels (or labels or categories). The labels may be designated by a user via portal 112. A user may access portal 112 via computing device 116. A user may access portal 112 by interacting with an application at computing device 116 capable of accessing portal 112. For example, the user may use browser 118 to traverse a network address (e.g., a uniform resource locator) to portal 112, which invokes a user interface 120 (e.g., a web page) in a browser window rendered on a display screen 122 coupled to computing device 116. By interacting with user interface 120, the user may utilize portal 120 to designate labels for data items to be received and cause AI engine 110 to train AI model 114, among other things. Computing device 116 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Using portal 112, a user may be provided a list of all the user-generated labels associated with the different data items retrieved by data fetcher 108. The user may select which labels in the list are to be utilized for training AI model 114. Upon selecting the labels, the user may cause AI engine 110 to train AI model 114, e.g., by interacting with a user-interactive element (e.g., a "Train" button) provided via portal 112. Upon interacting with the user-interactive element, data fetcher 108 may be configured to retrieve the data items from data stores(s) 106 that are associated with the selected labels. Data items and their associated user-generated labels are utilized to initially train AI model 114, and the accuracy of AI model 114 is determined (e.g., using cross-validation). In accordance with an embodiment, AI model 114 may be trained in accordance with a supervised ML algorithm that learns which label to apply to a particular data item based at least on the extracted features of data items (as described herein) used to train the model and their associated-user generated labels.

As will be described in greater detail below, AI engine 110 identifies a set of features to train AI model 114 in various ways. For instance, AI engine 110 may be configured to enlarge an initial set of features in the vectors that was used to train AI model 114 to determine a vector budget. In some example embodiments, the set of features is enlarged (e.g. iteratively) by adding additional features to the vectors for feature generators with one or more extendible outputs and training AI model 114 until a peak accuracy is determined. Based at least on the determined vector budget, subsets of features within the enlarged set of features are selectively removed from the vectors and replaced (e.g., iteratively) based at least on an accuracy of AI model 114 trained using the vectors. In this manner, as described in greater detail below, an optimized set of features may be identified to train AI model 114, thereby improving its accuracy in predicting labels for newly-received data items.

Computing device 123 may comprise any type of computing device that enables a user (e.g., a subscriber, data scientist, programmer, administrator, etc. of data item labeler 102) to configure one or more features of data item labeler 102, including but not limited to AI engine 110. As shown in FIG. 1, computing device 123 comprises a display screen 124 and a configuration interface 126. Computing device 123 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). In some implementations, computing device 116 and computing device 123 comprise a single computing device.

A user may access portal data item labeler 102 in which various features may be configured, such as by interacting with an application at computing device 123 capable of accessing data item labeler 102 (e.g., by using a browser in a similar manner as described above), which invokes a configuration interface 126 (e.g., a web page) in a browser window rendered on a display screen 124 coupled to computing device 123. By interacting with configuration interface 126, the user may configure various features relating to training AI model 114, as described herein.

When a new data item is subsequently received via application(s) 104 after AI model 114 is trained, it is fetched by data fetcher 108 and the features of the subsequently received data item are transformed into numerical vectors based on the set of features identified by AI engine 110. The vectorized data item is provided as an input to the AI model, and the AI model classifies the vectorized data item, such as by predicting the category or label for the subsequently received data item. The AI model may also provide a confidence level in its prediction of the category. The confidence level (which may be configured via configuration interface 126) may be a value between 0.0 and 1.0, where a relatively lower value is associated with a lower confidence level and a relatively higher value is associated with a higher confidence value. The predicted category and/or confidence level are provided to data fetcher 108. Data fetcher 108 may determine whether the confidence level is above a predetermined threshold. If the confidence level is above or equal the predetermined threshold, data fetcher 108 provides the predicted label to application(s) 104, and application(s) 104 apply the label to the data item accordingly. If the confidence level is below the predetermined threshold, data fetcher 108 does not provide the predicted label to application(s) 104, and the data item is not labeled.

Figure 2:
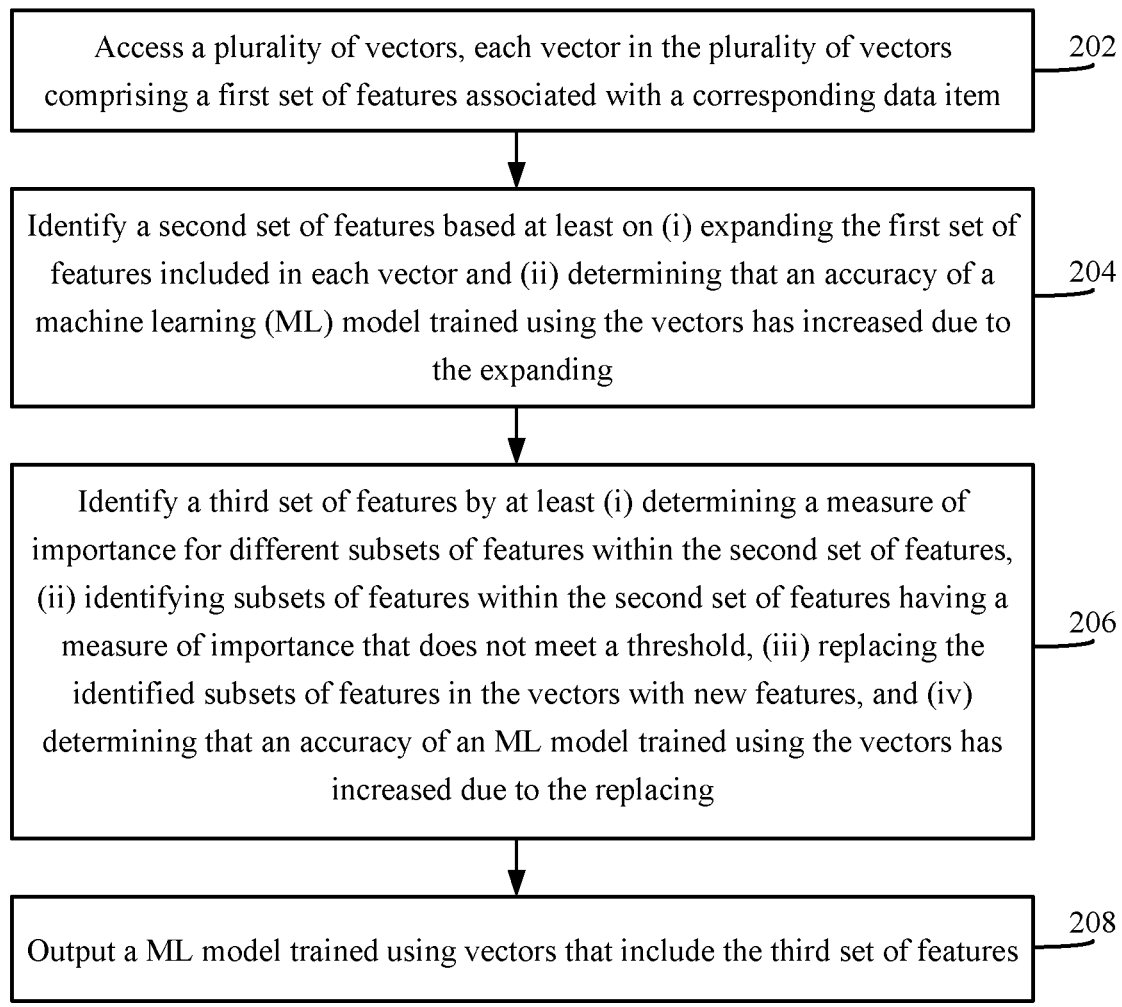
FIG. 2 shows a flowchart of a method for generating a ML model in accordance with an example embodiment.
Figure 3:
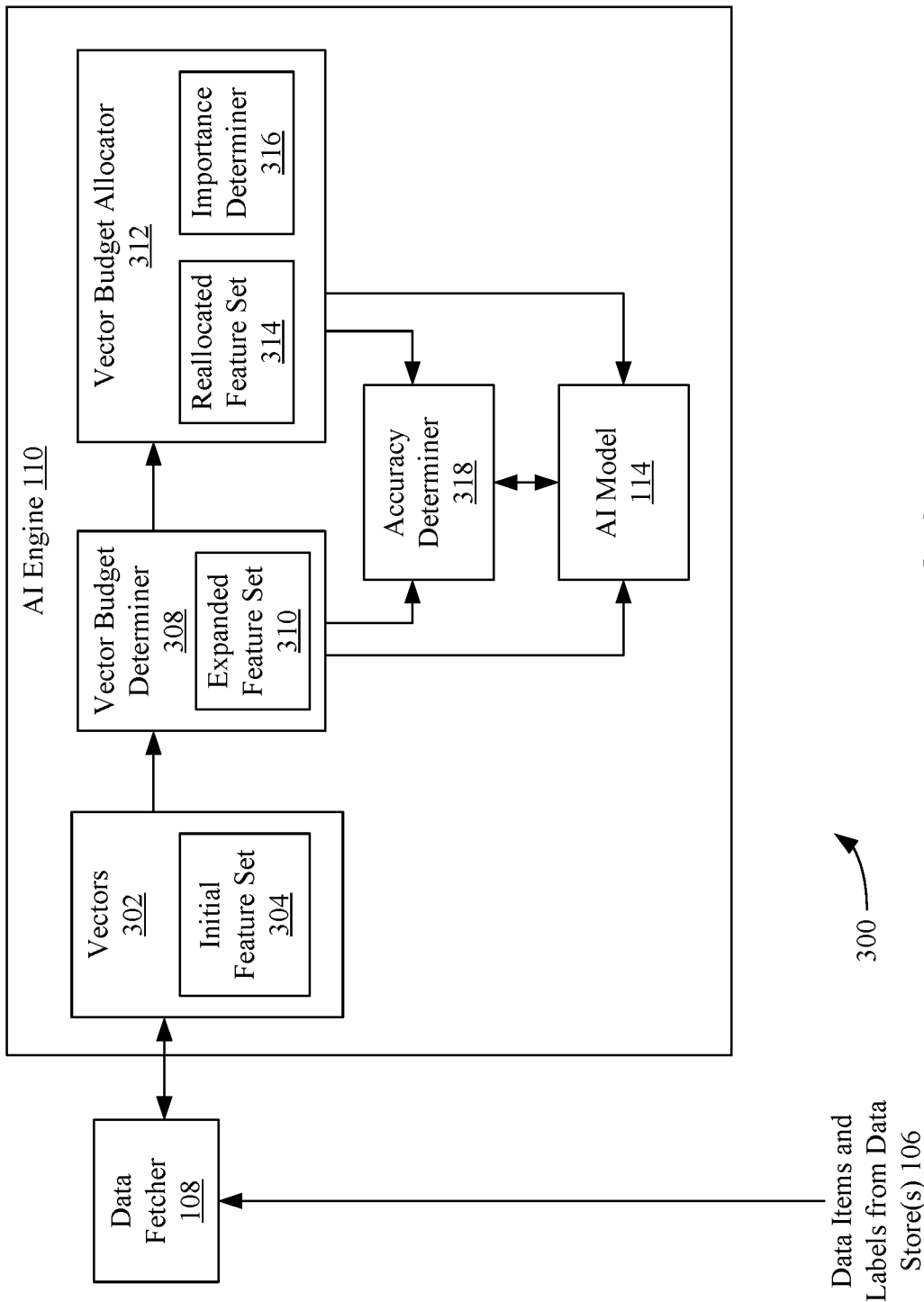
FIG. 3 shows a block diagram of a system for generating a ML model in accordance with an embodiment.

Embodiments described herein are configured to identify a feature set for training AI model 114 and training AI model 114 using the identified feature set. For instance, AI engine 110 may identify a feature set for training AI model 114 according to FIG. 2. FIG. 2 shows a flowchart 200 of a method for generating a ML model according to an example embodiment. For illustrative purposes, flowchart 200, AI engine 110, and AI model 114 are described as follows with respect to FIG. 3. FIG. 3 shows a block diagram of an example system 300 for generating a ML model in accordance with an embodiment. As shown in FIG. 3, system 300 includes an example implementation of data fetcher 108 and AI engine 110. Data fetcher 108 receives one or more data items and associated labels from one or more data store(s) 106. AI engine 110 includes vectors 302, a vector budget determiner 308, vector budget allocator 312, an accuracy determiner 318, and an example implementation of AI model 114. Vectors 302 includes an initial feature set 304. Vector budget determiner 308 includes an expanded feature set 310. Vector budget allocator 312 includes a reallocated feature set 314 and an importance determiner 316. Flowchart 200 and system 300 are described in further detail as follows.

When training AI model 114, a user may select labels of data items that are to be retrieved from data store(s) (e.g., data store(s) 106, as shown in FIG. 1), either directly or via application(s) 104. The data items having the selected labels are retrieved by data fetcher 108 and provided to AI engine 110. Vectors 302 are generated for each of the data items obtained from data store(s) 106. In examples, vectors 302 may comprise an initial feature set 304 that includes an initial set of features generated by one or more feature generators that employ a feature generating algorithm (e.g., an originating algorithm) or any other feature generating technique that maps an input source into numerical elements in a vector. For instance, the initial set of features may be generated for one or more different channels of each data item using one or more algorithms. For textual channels (e.g., a message subject or a message body), feature generating algorithms may comprise any algorithm that may be used to generate ML features for a data item, and such algorithms may include, but are not limited to, TF-IDF, PCA, natural language processing (NLP), bag of words, number of words, top unique words and/or phrases, repeating templates, linear discriminant analysis (LDA), latent semantic analysis (LSA), or any other suitable feature generating algorithm as appreciated by those skilled in the relevant arts. For a timestamp channel, the initial set of features may also include one or more features generated using a time histogram (e.g., based on a volume of received messages), a time of day, day of week, or other techniques for converting a date or time into a numerical value. For a recipient or sender channel, the initial set of features may include one or more features generated based on a top number of senders or recipients (e.g., top 5 senders, top 10 senders, etc.), a sender or recipient affiliation (e.g., a domain name), etc. Features of the initial feature set may also be generated using any other information or metadata associated with the data items, such as a number of recipients or senders, whether a message was replied to, a sentiment of a message, a priority of a message, whether the message has an attachment, etc.

These examples are illustrative only, and any other number and/or combination of feature generators may be employed in implementations. Further, it is noted that in some implementations, the selection and/or configuration of feature generators used herein may be predetermined and/or performed via configuration interface 126. Thus, initial feature set 304 may include features for one or more channels generated using a number of different feature generators, thereby generating vectors 302 representing the data items obtained from the data store(s).

In example embodiments, each feature of initial feature set 304 may correspond to a slot of a given vector. In this manner, each slot of the vector is populated with a different feature that is generated using various feature generators described herein. In some examples, a plurality of slots is assigned to the same channel (e.g., textual channel), each slot being populated using a particular feature generator. In some example embodiments, a plurality of slots is generated for the same channel using a same feature generating algorithm (e.g., PCA), where one slot is populated by analyzing the textual channel at the word level, and another slot is populated by analyzing the same textual channel at the character level.

It is also noted that feature sets described herein (including initial feature set 304, expanded feature set 310, and/or reallocated feature set 314) may include one or more fixed features which are not extendible to include additional features, and one or more extendible feature sets which are extendible to include additional features. For instance, certain feature generators have extendible outputs, such as additional features that may be generated using the same feature generator, while other feature generators have fixed outputs. Examples of extendible outputs include, but are not limited to, features that are generated relating to the top 5 senders, top 10 senders, top 20 senders, etc., which are generated using the same algorithm for the same channel. Other examples of extendible outputs also include a result of a PCA on a TF-IDF matrix, a number of top affiliations, a number of top templates, a number of top words, etc. Examples of fixed outputs include, but are not limited to, features that cannot be extended, such an integer value that identifies a number of recipients in a message, a Boolean value indicating whether a message has an attachment, a Boolean value indicating whether the message was sent on a particular day of a week, whether a message was sent or received during working hours, a number of people in a message, etc. In other words, extendible outputs include additional features that are generated using the same feature generator for the same channel, while fixed outputs include features for a given channel that cannot be enlarged or expanded.

Vector budget determiner 308 is configured to access the plurality of vectors 302 and identify an expanded feature set 310 based at least on an accuracy of a ML model trained using vectors including the expanded feature set. In implementations, expanded feature set 310 comprises one or more features in addition to the features in initial feature set 304, such as by generating additional features for feature generators with extendible outputs. Upon expanding the features, AI model 114 is trained using vectors containing the expanded features, and accuracy determiner 318 determines an accuracy thereof. As will be described in greater detail below, vector budget determiner 308 may operate in an iterative manner in some instances until an accuracy of AI model 114 does not increase compared to a prior iteration.

Vector budget allocator 312 is configured to obtain expanded feature set 310 and selectively reallocate subsets of features therein. For instance, importance determiner 316 is configured to determine a measure of importance for each feature in expanded feature 310 that was used to train AI model 114. Based on the determined measures of importance, features with lower measures of importance may be removed from the set of features and replaced with new features. In some examples, vector budget allocator 312 reallocates the slots for the removed features to new features by allocating those slots to one or more feature generators that generated features with higher measures of importance. Upon reallocating the features in this manner, AI model 114 is trained and accuracy determiner 318 determines an accuracy thereof. The disclosed techniques are performed iteratively in some example embodiments until a stopping criteria has been reached (e.g., a predetermined number of iterations has occurred, a desired accuracy criteria has been satisfied, etc.). In such examples, vector budget allocator 312 identifies reallocated feature set 314 as the set of features that resulted in the highest accuracy of AI model 114. In the disclosed manner, AI engine 110 is configured to improve the initial set of vectors 302 over time, even in instances where the set of labeled data items remains the same Referring back to FIG. 2, flowchart 200 begins with step 202. In step 202, a plurality of vectors are accessed, each vector in the plurality of vectors comprising a first set of features associated with a corresponding data item. For instance, with reference to FIG. 3, vector budget determiner 308 is configured to access a plurality of vectors 302. As described above, each vector of vectors 302 includes an initial feature set 304 associated with a corresponding data item. For example, each initial feature set 304 includes a set of features generated using one or more feature generators (e.g., feature generation algorithms or other techniques) for one or more channels of the data item obtained from data store(s) 106. In examples, vectors 302 may also include labels (e.g., manually assigned labels) assigned to each data item, which are used to train AI model 114 and/or determine an accuracy thereof, described in greater detail below.

In implementations, the plurality of vectors are accessed to retrain AI model 114 as described below in response to a user request to retrain the model (e.g., via user interface 120), automatically based on a predetermined time period, such as a recurring time period (which may be configured via a suitable interface such as configuration interface 126), or automatically in the background to continuously improve the model.

In step 204, a second set of features is identified based at least on (i) expanding the first set of features included in each vector and (ii) determining that an accuracy of a ML model trained using the vectors has increased due to the expanding. For instance, with reference to FIG. 3, vector budget determiner 308 is configured to identify a second set of features (e.g., expanded feature set 310) based at least on expanding initial feature set 304 included in each vector of vectors 302, and determine that an accuracy of AI model 114 trained using the vectors (e.g., vectors containing the expanded feature set) has increased due to the expanding.

In examples, vector budget determiner 308 initially trains AI model 114 using vectors 302 that include initial feature set 304. Vector budget determiner 308 is also configured to cause accuracy determiner 318 to determine an accuracy of AI model 114 trained using vectors 302. Accuracy determiner 318 determines an accuracy of AI model 114 in various ways. In some implementations, accuracy determiner 318 is configured to determine the accuracy of AI model 114 using a cross-validation technique (e.g., k-fold cross validation). In such a technique, accuracy determiner 318 partitions vectors 302 into k-partitions. Accuracy determiner 318 trains AI model 114 for different training sets of k−1 partitions in a supervised manner, and use the trained model to validate labels assigned to the data items in the remaining partition that was not included in the k−1 training set. This process is repeated for each possible k−1 training set to determine an overall accuracy of AI model 114. It is noted and understood that while it is described herein that accuracy determiner 318 may determine an accuracy of AI model 114 using cross-validation, other techniques for determining an accuracy of AI model 114, or otherwise validating predictions generated by applying AI model 114, are also contemplated.

As described above, vector budget determiner 308 expands initial feature set 304 to add one or more additional features. For instance, for each feature generator (e.g., feature generating algorithm) which contains extendible outputs, vector budget determiner 308 is configured to add one or more additional features from the feature generator to include in the vectors. Vector budget determiner 308 is configured to expand initial feature set 304 included in each vector by expanding at least one of the extendable feature sets, as described above, while maintaining the fixed features in the vectors. Any number of features is added (e.g., one feature, two features, etc.) based on a preset configuration and/or a user configuration via configuration interface 126. For instance, vector budget determiner 308 may add a single feature from a single feature of a single feature generator to include in the vectors or may add a plurality of features (e.g., adding a single feature or even multiple features for each feature generator technique with extendible outputs). As an illustrative example, if initial feature set 304 contained 30 total features of which 15 were generated by feature generators with extendible outputs, the feature set may be expanded to include a total of 45 features, with the each of the 15 additional features corresponding to each feature generator with an extendible output.

Upon expanding initial feature set 304 to include one or more additional features, vector budget determiner 308 trains AI model 114 using vectors containing expanded feature set 310 (i.e., the features in initial feature set 304 and the additional features), and cause accuracy determiner 318 to determine an accuracy thereof (e.g., using k-fold cross validation in a similar manner as described herein). In some examples, vector budget determiner 308 determines that an accuracy of AI model 114 trained using the expanded vectors has increased due to the expanding. For instance, by virtue of expanding initial feature set 304 to include one or more additional features, it is determined that AI model 114 trained using vectors that include the additional features is more accurate than the model previously trained using initial feature set 304.

In some example implementations, step 204 is performed using one or more further iterations to further enhance the accuracy of AI model 114. For instance, additional features are added to vectors of a prior iteration, thereby further expanding the set of features and determining the accuracy of AI model 114 trained using vectors containing the further expanded set of features. In some implementations, this process is repeated over a number of iterations, such as until a stopping criteria has been determined, as will be described in greater detail below.

In this manner, vector budget determiner 308 is configured to identify expanded feature set 310 that may lead to a more accurately trained AI model than initial feature set 304. In implementations, as explained below, expanded feature set 310 comprises the vector budget (e.g., the total number of n features in the expanded feature set) that is used during a further enhancement the accuracy of AI model 114.

In step 206, a third set of features is identified by at least (i) determining a measure of importance for different subsets of features within the second set of features, (ii) identifying subsets of features within the second set of features having a measure of importance that does not meet a threshold, (iii) replacing the identified subsets of features in the vectors with new features, and (iv) determining that an accuracy of a ML model trained using the vectors has increased due to the replacing. For instance, with reference to FIG. 3, vector budget allocator 312 is configured to identify reallocated feature set 314. Reallocated feature set 314 is identified, at least in part, based on a measure of importance for different subsets of features within expanded feature set 310 determined by importance determiner 316. For example, expanded feature set 310 is separated into different subsets, such as by the feature generators used to generate the features (e.g., one subset of features that were generated using PCA, another subset of features that were generated using TF-IDF, etc.)

Importance determiner 316 determines the measure of importance for each of the subsets of features in various ways. For instance, importance determiner 316 determines a measure of importance for each subset of features in expanded feature set 310 relative to the other subsets of features in the expanded feature set 310. In some implementations, importance determiner 316 processes the vectors used to train AI model 114 using a predictive algorithm, such as random forest or random decision forest, that is configured to identify a measure of importance (e.g., a variable importance) for each feature that was included in a set of features used to train a ML model. In other words, such predictive algorithms are configured to output the relative importance of each feature in the set of features as a measure of its predictive power or contribution in the overall model (e.g., how important the particular feature is in terms of predicting labels for newly received data items). While example embodiments are described herein in which importance determiner may implement predictive algorithms such as random forest, it is contemplated that importance determiner 316 may implement any other techniques or algorithms to determine a measure of importance, weights, contributions, etc. of each feature, as appreciated to those skilled in the relevant arts.

In some implementations, upon determining a measure of importance for each individual feature in the feature set, one or more mathematical operations are performed to aggregate and/or normalize the measures of importance to determine relative contributions of each feature generator (e.g., feature-generating algorithm or other technique described herein). For instance, the measures of importance for all of the features for a given feature generator are aggregated to determine a subset importance measure (e.g., summing the measures of importance for features generated by PCA, summing the measures of importance for features generated by a given fixed feature generator, etc.). In this manner, a listing of measures of importance (e.g., contributions) for different subsets of features is determined, each subset relating to a different feature generator. In other words, each slot (i.e., feature) in the vector may be associated with a particular feature generator, and the measures of importance for each slot associated with a given feature generator may be aggregated to generate a listing of measures of importance per feature generator (e.g., a listing of subset importance measures). In some further implementations, the values identifying the measures of importance per feature generator is normalized. For instance, for each feature generator, the values identifying the aggregated measures of importance is divided by an aggregated value of all of the measures of importance, thereby normalizing all of the values of aggregated measures of importance per feature generator to values between 0 and 1 (with a total sum of 1 following normalization), and where the measure of importance for each subset of features (e.g., each feature generator) is relative to the other subsets of features in the expanded feature set 310.

As described above, for subsets of features within expanded feature set 310 are identified that do not meet a threshold value. The threshold value may comprise any value between 0 and 1. For instance, the threshold value may be a fixed value that indicates that the subset of features is not sufficient contributor to the overall ML model. In implementations, such a threshold value may be preset, and/or may be configured by a user (e.g., via configuration interface 126). For the subsets of features that do not meet the threshold measure of importance value, the subsets of features may be removed from the vectors containing expanded feature set 310 and replaced with new features. In other words, feature generators that are determined not to be significant based on their respective measure of importance are removed from the vector, thereby releasing one or more slots that are populated with new features.

In implementations, the released slots are allocated to other feature generators that did meet the threshold measure of importance. The reallocation is performed in various ways, such as by allocating the released slots on a prorated basis or according to the contribution ratio of each feature generating algorithm (e.g., algorithms with a higher measure of importance are allocated more additional slots than algorithms with a lower measure of importance). Remaining slots after the reallocation (e.g., leftover slots) may be randomly distributed, e.g., to feature generating algorithms that did not meet the threshold, and/or to feature generating algorithms that did meet the threshold. As an illustration, if 10 slots were released and 4 feature generating algorithms remained that exceeded the threshold measure of importance, 3 slots may be reallocated to the algorithm with the highest measure of importance, 2 slots may be reallocated to the algorithm with the second highest measure of importance, and 1 slot may be reallocated to each the remaining two algorithms. In this illustrative example, the remaining 3 slots may be reallocated in any suitable manner, such as by reallocating those slots to one or more feature generating algorithms that did not meet a threshold value.

It is noted that in some example embodiments, if a subset of features for particular algorithm is determined to have a measure of importance that does not meet a threshold value and therefore should be removed from the vector, a further determination is made whether the particular algorithm is the only remaining algorithm associated with a given channel of the items of data. In other words, if a particular channel (e.g., a timestamp channel) of the data items would no longer be represented by any features in the vector if the subset of features was removed from the vector, the slots assigned to the algorithm is reduced to 1, rather than removing the entire subset of features entirely, thereby ensuring that the channel is still represented by at least one feature in the vector. In other scenarios, such as where more than two algorithms for a channel (e.g., a channel not represented by any other algorithms in the vector) are to be removed based on their respective measures of importance failing to meet the threshold, the subset of features for the algorithm with the lower measure of importance are removed, while the subset of features (or a single feature of the subset, if the slots are reduced to 1) for the algorithm with the higher measure of importance remains in the vector.

In implementations, upon replacing subsets of features in expanded feature set 310 with new features, thereby generating vectors that include reallocated feature set 314, vector budget allocator 312 causes AI model 114 to be trained with the vectors containing reallocated feature set 314. Further, vector budget allocator 312 also causes accuracy determiner 318 to determine an accuracy of AI model 114 trained using such vectors in a similar manner as described above (e.g., using k-fold cross validation or any other validation technique). Based at least on the reallocated feature set that comprises removing and replacing subsets of features, it is determined that an accuracy of AI model trained using vectors containing the reallocated feature set has increased. The new accuracy is saved. In some implementations, as will be described in greater detail below, the process described herein is performed iteratively (e.g., reallocating features and determining an accuracy) for a number of iteration to identify a feature set for training AI model 114 with an even greater accuracy.

In step 208, a ML model trained using vectors that include the third set of features is outputted. For instance, with reference to FIG. 3, vector budget determiner 312 is configured to output AI model 114 that is trained using vectors that include reallocated feature set 314. For instance, as described earlier, reallocated feature set 314 may comprise features that are determined to result in a model trained with increased accuracy by, among other things, a reallocation of features. In some examples, vector budget reallocator 312 is configured to output a re-trained AI model 114 upon identifying reallocated feature set 314. In other examples, vector budget reallocator 312 is configured to output a model (e.g., a model of a prior iteration that satisfied an accuracy criteria) that was previously trained and stored.

Upon outputting AI model 114 that is trained using vectors that include reallocated feature set 314, data item labeler 102 may classify a subsequently received data item (e.g., by predicting a category or label) using the outputted model. For instance, subsequent to AI model 114 being trained and outputted using vectors that include reallocated feature set 314 as described earlier, application(s) 104 obtains a data item. Data item labeler 102 obtains this subsequently received data item (e.g., via the application or the associated data store) for classification and vectorizes the data item. Data item labeler 102 provides the vectorized data item as an input to AI model 114 to obtain a classification thereof. The classification (e.g., the predicted label for an email, message, ticket, etc.) is provided to application(s) 104, and application(s) 104 applies the label to the data item accordingly.

Accordingly, in implementations, the vector used to train AI model 114 is refined in a manner that results in more accurate model training. Rather than utilizing features that are not useful and may potentially complicate the training process while using additional computational resources, such features may instead be selectively replaced in an iterative manner with other features that are likely to be more informative. By automatically determining which features have higher measures of importance) and which features have lower measures of importance, different features are emphasized more or less (or removed entirely) from the vectors used to train AI model 114, resulting improved accuracy. Furthermore, these techniques are also user-specific, since each user has different message elements from which features are generated, and therefore different features are emphasized more or less based on the user's messages.

FIG. 4 shows a diagram illustrating a vector 400 comprising a set of features for training a ML model in accordance with an embodiment. As shown in FIG. 4, vector 400 includes a number of features 402, with each feature populating a slot of vector 400. Furthermore, as described herein, each of features 402 may be generated for one or more channels of the data items. For instance, as shown in FIG. 4, a first channel 404 comprises three separate features, each of which are generated by a feature generator (which may be different or the same for all of the features). Similarly, a second channel 406 comprises three two features, generated by one or more feature generators, and a third channel 408 comprises four features, generated by one or more feature generators. Any of the feature generators used to generate features in any of channels 404, 406, and 408 has extendible and/or fixed outputs, as described herein. As shown in FIG. 4, vector 400 also includes one or more predicted element slots 410, which comprises labels (e.g., user-specified labels) that are used to train AI model 114, e.g., in a supervised manner.

In examples, vector 400 illustrates an example vector that includes any of initial feature set 304, expanded feature set 310, and/or reallocated feature set 314. For instance, while the particular arrangement shown in FIG. 4 is not intended to be limiting, vector 400 illustrates an example vector in which one or more features are replaced and replaced with new features to improve an accuracy of AI model 114. Further, as noted earlier, in some implementation, vector 400 is configured such that each of channels 404, 406, and 408 has at least one associated feature to ensure that the channel is represented in the vector, even if a measure of importance for the feature (or a subset of features containing that feature) is below a threshold value.

As described above, subsets of features with a measure of importance that do not meet a threshold value are replaced with new features in a vector. For example, FIG. 5 shows a flowchart of a method for replacing one or more subsets of features in a vector in accordance with an example embodiment. In an implementation, the method of flowchart 500 may be implemented by vector budget allocator 312. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, subsets of features identified as having a measure of importance that did not meet a threshold value are removed from the vectors, thereby removing a particular number of features from the vectors. For example, with reference to FIG. 3, each subset of features in expanded feature set 310 is generated by a different feature generators, and importance determiner 316 of vector budget allocator 312 thereby determines a measure of importance for each of the subsets of features corresponding to the different feature generators. For subsets of features from expanded feature set 310 that were identified as having a measure of importance that did not meet a threshold value, as described earlier, importance determiner 316 removes the identified subsets of features from the vectors (e.g., vectors that contained expanded feature set 310), thereby removing a particular number of features from the vectors. In other words, upon removing the subset of features from the vectors, the number of removed features are identified, thereby also identifying the number of slots that are reallocated for new features during a reallocation process.

In step 504, one or more subsets of features in the vectors having a measure of importance that does meet the threshold are expanded, wherein the total amount of features added to the vectors by virtue of the expanding is equal to the particular number of features that were removed. For instance, with reference to FIG. 3, as described earlier, importance determiner 317 identifies one or more subsets of features in expanded feature set 310 that had a measure of importance that did not meet the threshold value (which may be removed, as described in step 502), and one or more subsets of features that had a measure of importance that did meet the threshold value. For subsets of features in expanded feature set 310 that had a measure of importance that did meet the threshold value, vector budget allocator 312 is configured to expand those subsets of features. For example, as described earlier, since the subsets of features corresponds to different feature generators, the number of features added to the subsets of features that did meet the threshold value by virtue of the expansion is equal to the particular number of features (e.g., number of slots) that were removed from the vectors. In this manner, feature generators that have a greater importance are allocated more slots in the vectors, and therefore more features, than feature generators that have a lesser importance. As a result of such an such a reallocation, AI model 114 is trained in a more accurate manner even though the total number of features in the vectors remains the same (i.e., the total number of features does not exceed the vector budget as earlier determined by vector budget determiner 308), thereby also reducing the consumption of both storage and/or processing resources when training AI model 114.

As described above, vector budget determiner 308 determines a vector budget by iteratively expanding a set of features. For example, FIG. 6 shows a flowchart of a method for identifying a second set of features in an iterative manner in accordance with an example embodiment. In an implementation, the method of flowchart 600 may be implemented by vector budget determiner 308. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, the second set of features is identified in an iterative manner until the accuracy of a trained ML model does not improve compared to an accuracy of a prior iteration. For instance, with reference to FIG. 3, vector budget determiner 308 is configured to identify expanded feature set 310 in an iterative manner. In some implementations, vector budget determiner 308 identifies expanded feature set 310 by iteratively: (i) expanding a set of features included in each vector in a prior iteration and (ii) determining an accuracy of a ML model trained using the vectors, until the accuracy does not improve compared to an accuracy of the prior iteration.

In other words, features in vectors 302 that include initial feature set 304 is expanded over the course of a plurality of iterations. For instance, in each iteration, one additional feature (e.g., one additional slot in the vector) is added to the vector for each feature generator with an extendible output (e.g., adding one more feature for a PCA algorithm, one more top senders feature, etc.). In each iteration, vectors containing the expanded set of features (for that iteration) is used to train AI model 114, and an accuracy determiner 318 determines an accuracy thereof in a similar manner as described earlier (e.g., using k-fold cross validation or any other suitable validation technique). Upon determining the accuracy for the vectors in a given iteration, the accuracy is saved, and the next iteration commences thereafter. In the next iteration, one or more additional features are added to the vectors from the prior iteration, and AI model 114 is trained once again and an accuracy determined thereof.

In examples, such iterations proceed until a stopping criteria is satisfied, which may be predetermined and/or configured via a suitable interface (e.g., configuration interface 126). In one implementation, the stopping criteria comprises a point at which the determined accuracy of a ML model trained using vectors containing the expanded features does not increase, or increases only by a marginal amount. For instance, upon adding features to a vector (sometimes many features), the overall size of the vector begins to exhibit artifacts that begin to degrade the quality of the ML model. In such a scenario, therefore, when the number of features that are added to the vectors begins results in a ML model that no longer shows an accuracy improvement compared to the prior iteration, the accuracy of the prior iteration is inferred as a peak accuracy and the feature set used to train the ML model in the prior iteration is used to set the vector budget size for the subsequent steps of reallocation subsets of features. In another implementation, the stopping criteria comprises completion of a predetermined number of iterations, with the iteration having the highest model accuracy being selected to determine the vector budget size. These examples are not limiting, and it is understood that other suitable stopping criteria may also be employed and/or configured (e.g., via a configuration interface 126).

As described above, vector budget allocator 312 reallocates features in vectors to further improve an accuracy of AI model 114. For example, FIG. 7 shows a flowchart of a method for identifying a third set of features in an iterative manner in accordance with an example embodiment. In an implementation, the method of flowchart 700 may be implemented by vector budget allocator 312. FIG. 7 is described with continued reference to FIG. 3. Other structural and operational implementations will be apparent to persons skilled in the relevant art(s) based on the following discussion regarding flowchart 700 and system 300 of FIG. 3.

Flowchart 700 begins with step 702. In step 702, the third set of features is identified in an iterative manner until at least one of a predetermined number of iterations has occurred, or a desired accuracy criteria has been satisfied. For instance, with reference to FIG. 3, vector budget allocator 312 is configured to reallocated feature set 314 in an iterative manner. In some implementations, vector budget allocator 312 identifies reallocated feature set 314 by iteratively: (i) determining a measure of importance for different subsets of features within a set of features in a prior iteration, (ii) identifying subsets of features within the set of features in the prior iteration having a measure of importance that does not meet the threshold, (iii) replacing the identified subsets of features in the vectors with new features, and (iv) determining an accuracy of the ML model trained using the vectors, until at least one of a predetermined number of iterations has occurred, or a desired accuracy criteria has been satisfied.

For example, in one iteration, vector budget allocator 312 determines a measure of importance for different subsets of features (e.g., for different feature generators) within a set of features in a prior iteration, in a similar manner as described above with respect to step 206. Further, in that same iteration, as also described earlier, the subsets of features that have a measure of importance that do not meet the threshold are identified and replaced in the vectors with new features. The new features, for instance, are allocated to feature generators that had a measure of importance that did meet the threshold value. Upon replacing the identified subsets of features with new features in the vectors, AI model 114 is trained using the vectors and an accuracy is determined thereof by accuracy determiner 318, in a similar manner as described above.

In implementations, such iterations continue until a predetermined number of iterations has occurred, which may be preset and/or configured via configuration interface 126. In such implementations, after the predetermined number of configurations has occurred, the set of features resulting in the highest accuracy among the different iterations is selected as reallocated feature set 314 and used for training AI model 114. In other implementations, iterations continue until a desired accuracy criteria has been satisfied, such as a threshold accuracy level preset and/or configured via configuration interface 126. For instance, vector budget allocator 312 is configured to stop the iterations once a threshold accuracy level is achieved. In yet other implementations, iterations continue until an accuracy reaches a predefined and/or configured saturation point (e.g., until improvements in accuracy do not increase or only increase by a marginal amount). The described examples are not limiting, and it is understood that other suitable stopping criteria may also be employed and/or configured (e.g., via a configuration interface 126) for identifying reallocated feature set 314.

It is noted that in implementations, training of AI model 114 as described herein may be performed by vector budget determiner 308, vector budget allocator 312, and/or any other component not expressly illustrated. It is also noted that in some implementations, where additional features are added (either by vector budget determiner 308 during an expansion process, or by vector budget allocator 312 during a replacement process), the newly added features may be generated from the original set of data obtained by data fetcher 108, and/or generated by obtaining additional data from data store(s) 106. For example, for some feature sets, to expand the vector to include additional features, such as where a "top senders" feature is of high importance, additional data may be obtained from data store(s) 106 to identify additional top senders that may be used for a subsequent iteration in by vector budget determiner 308 and/or by vector budget allocator 312.

III. Example Computer System Implementation

Data item labeler 102, data fetcher 108, AI engine 110, AI model 114, portal 112, browser 118, vectors 302, initial vector set 304, vector budget determiner 308, expanded feature set 310, vector budget allocator 312, reallocated feature set 314, importance determiner 316, accuracy determiner 318 (and/or any of the components described therein), vector 400, flowchart 200, flowchart 500, flowchart 600, and/or flowchart 700, may be implemented in hardware, or hardware combined with one or both of software and/or firmware. For example, data item labeler 102, data fetcher 108, AI engine 110, AI model 114, portal 112, browser 118, vectors 302, initial vector set 304, vector budget determiner 308, expanded feature set 310, vector budget allocator 312, reallocated feature set 314, importance determiner 316, accuracy determiner 318 (and/or any of the components described therein), vector 400, flowchart 200, flowchart 500, flowchart 600, and/or flowchart 700 may be implemented as computer program code/instructions configured to be executed in one or more processors and stored in a computer readable storage medium.

Alternatively, data item labeler 102, data fetcher 108, AI engine 110, AI model 114, portal 112, browser 118, vectors 302, initial vector set 304, vector budget determiner 308, expanded feature set 310, vector budget allocator 312, reallocated feature set 314, importance determiner 316, accuracy determiner 318 (and/or any of the components described therein), vector 400, flowchart 200, flowchart 500, flowchart 600, and/or flowchart 700 may be implemented as hardware logic/electrical circuitry.

For instance, in an embodiment, one or more, in any combination, of data item labeler 102, data fetcher 108, AI engine 110, AI model 114, portal 112, browser 118, vectors 302, initial vector set 304, vector budget determiner 308, expanded feature set 310, vector budget allocator 312, reallocated feature set 314, importance determiner 316, accuracy determiner 318 (and/or any of the components described therein), vector 400, flowchart 200, flowchart 500, flowchart 600, and/or flowchart 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
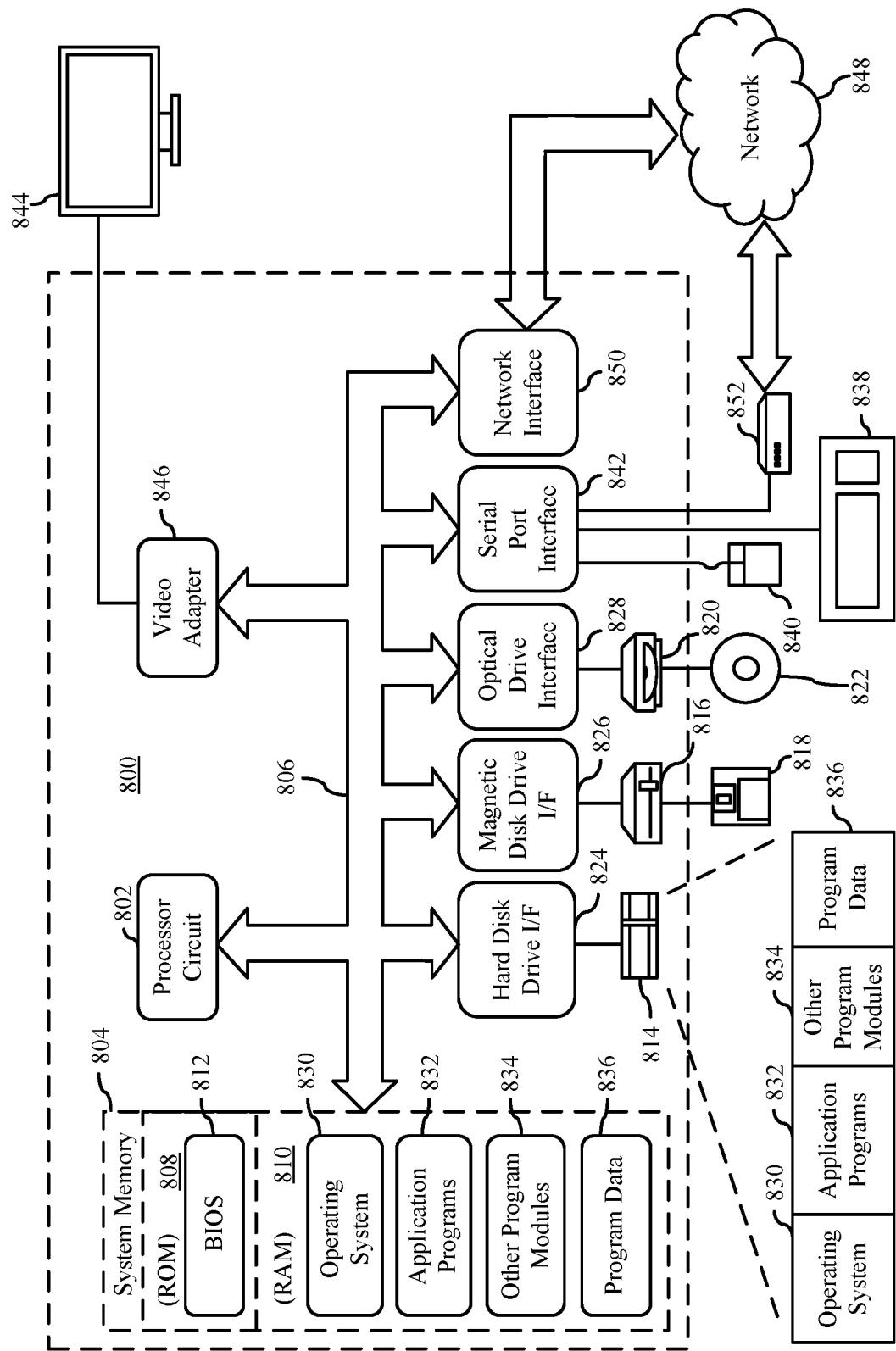
FIG. 8 is a block diagram of an example processor-based computer system that may be used to implement various embodiments.

FIG. 8 depicts an exemplary implementation of a computing device 800 in which embodiments may be implemented. For example, data item labeler 102, data fetcher 108, AI engine 110, AI model 114, portal 112, browser 118, vectors 302, initial vector set 304, vector budget determiner 308, expanded feature set 310, vector budget allocator 312, reallocated feature set 314, importance determiner 316, accuracy determiner 318 (and/or any of the components described therein), vector 400, flowchart 200, flowchart 500, flowchart 600, and/or flowchart 700 (and/or any of the steps of flowcharts 200, 500, 600, and 700 described therein) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing any of the features of data item labeler 102, data fetcher 108, AI engine 110, AI model 114, portal 112, browser 118, vectors 302, initial vector set 304, vector budget determiner 308, expanded feature set 310, vector budget allocator 312, reallocated feature set 314, importance determiner 316, accuracy determiner 318 (and/or any of the components described therein), vector 400, flowchart 200, flowchart 500, flowchart 600, and/or flowchart 700, and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A system for generating a ML model is disclosed herein. The system includes: at least one processor circuit; and at least one memory that stores program code configured to be executed by the at least one processor circuit, the program code comprising: a vector budget determiner configured to: access a plurality of vectors, each vector in the plurality of vectors comprising a first set of features associated with a corresponding data item, and identify a second set of features based at least on (i) expanding the first set of features included in each vector and (ii) determining that an accuracy of a ML model trained using the vectors has increased due to the expanding; and a vector budget allocator configured to: identify a third set of features by at least (i) determining a measure of importance for different subsets of features within the second set of features, (ii) identifying subsets of features within the second set of features having a measure of importance that does not meet a threshold; (iii) replacing the identified subsets of features in the vectors with new features, and (iv) determining that an accuracy of a ML model trained using the vectors has increased due to the replacing; and output a ML model trained using vectors that include the third set of features.

In one implementation of the foregoing system, each data item comprises one of: an email; a customer relationship management application-related message; or a support ticketing system-related message.

In another implementation of the foregoing system, the system further comprises a data item labeler that is configured to use the outputted ML model to classify a data item received subsequent to the training thereof.

In another implementation of the foregoing system, the first set of features comprises one or more fixed features and one or more extendable feature sets, and the vector budget determiner is configured to expand the set of features included in each vector by expanding at least one of the extendable feature sets.

In another implementation of the foregoing system, each subset of features in the second set of features is generated by a different feature-generating algorithm, and the vector budget allocator is configured to replace the identified subsets of features in the vectors with new features by: removing the identified subsets of features from the vectors, thereby removing a particular number of features from the vectors; and expanding one or more subsets of features in the vectors having a measure of importance that does meet the threshold, the total amount of features added to the vectors by virtue of the expanding is equal to the particular number of features that were removed.

In another implementation of the foregoing system, the vector budget allocator is configured to determine the measure of importance for the different subsets of features within the second set of features by: determining a measure of importance for each subset of features in the second set of features relative to the other subsets of features in the second set of features.

In another implementation of the foregoing system, the vector budget determiner is configured to identify the second set of features by iteratively: (i) expanding a set of features included in each vector in a prior iteration and (ii) determining an accuracy of a ML model trained using the vectors, until the accuracy does not improve compared to an accuracy of the prior iteration.

In another implementation of the foregoing system, the vector budget allocator is configured to identify the third set of features by iteratively: (i) determining a measure of importance for different subsets of features within a set of features in a prior iteration, (ii) identifying subsets of features within the set of features in the prior iteration having a measure of importance that does not meet the threshold, (iii) replacing the identified subsets of features in the vectors with new features, and (iv) determining an accuracy of the ML model trained using the vectors, until at least one of a predetermined number of iterations has occurred, or a desired accuracy criteria has been satisfied.

A method for generating a ML model is disclosed herein. The method includes: accessing a plurality of vectors, each vector in the plurality of vectors comprising a first set of features associated with a corresponding data item; identifying a second set of features based at least on (i) expanding the first set of features included in each vector and (ii) determining that an accuracy of a ML model trained using the vectors has increased due to the expanding; identifying a third set of features by at least (i) determining a measure of importance for different subsets of features within the second set of features, (ii) identifying subsets of features within the second set of features having a measure of importance that does not meet a threshold, (iii) replacing the identified subsets of features in the vectors with new features, and (iv) determining that an accuracy of a ML model trained using the vectors has increased due to the replacing;

and outputting a ML model trained using vectors that include the third set of features.

In one implementation of the foregoing method, the method further includes: using the outputted ML model to classify a data item received subsequent to the training thereof.

In another implementation of the foregoing method, the first set of features comprises one or more fixed features and one or more extendable feature sets, and expanding the set of features included in each vector comprises expanding at least one of the extendable feature sets.

In another implementation of the foregoing method, each subset of features in the second set of features is generated by a different feature-generating algorithm, and replacing the identified subsets of features in the vectors with new features comprises: removing the identified subsets of features from the vectors, thereby removing a particular number of features from the vectors; and expanding one or more subsets of features in the vectors having a measure of importance that does meet the threshold, the total amount of features added to the vectors by virtue of the expanding is equal to the particular number of features that were removed.

In another implementation of the foregoing method, the identifying the second set of features comprises iteratively: (i) expanding a set of features included in each vector in a prior iteration and (ii) determining an accuracy of a ML model trained using the vectors, until the accuracy does not improve compared to an accuracy of the prior iteration.

In another implementation of the foregoing method, the identifying the third set of features comprises iteratively (i) determining a measure of importance for different subsets of features within a set of features in a prior iteration, (ii) identifying subsets of features within the set of features in the prior iteration having a measure of importance that does not meet the threshold, (iii) replacing the identified subsets of features in the vectors with new features, and (iv) determining an accuracy of the ML model trained using the vectors, until at least one of a predetermined number of iterations has occurred, or a desired accuracy criteria has been satisfied.

A computer-readable storage medium is disclosed herein. The computer-readable storage medium has program instructions recorded thereon that, when executed by at least one processor of a computing device, perform a method, the method comprising: accessing a plurality of vectors, each vector in the plurality of vectors comprising a first set of features associated with a corresponding data item; identifying a second set of features based at least on (i) expanding the first set of features included in each vector and (ii) determining that an accuracy of a ML model trained using the vectors has increased due to the expanding; identifying a third set of features by at least (i) determining a measure of importance for different subsets of features within the second set of features, (ii) identifying subsets of features within the second set of features having a measure of importance that does not meet a threshold, (iii) replacing the identified subsets of features in the vectors with new features, and (iv) determining that an accuracy of a ML model trained using the vectors has increased due to the replacing; and outputting a ML model trained using vectors that include the third set of features.

In one implementation of the foregoing computer-readable storage medium, the method further comprises: using the outputted ML model to classify a data item received subsequent to the training thereof.

In another implementation of the foregoing computer-readable storage medium, the first set of features comprises one or more fixed features and one or more extendable feature sets, and expanding the set of features included in each vector comprises expanding at least one of the extendable feature sets.

In another implementation of the foregoing computer-readable storage medium, each subset of features in the second set of features is generated by a different feature-generating algorithm, and replacing the identified subsets of features in the vectors with new features comprises: removing the identified subsets of features from the vectors, thereby removing a particular number of features from the vectors; and expanding one or more subsets of features in the vectors having a measure of importance that does meet the threshold, the total amount of features added to the vectors by virtue of the expanding is equal to the particular number of features that were removed.

In another implementation of the foregoing computer-readable storage medium, the identifying the second set of features comprises iteratively: (i) expanding a set of features included in each vector in a prior iteration and (ii) determining an accuracy of a ML model trained using the vectors, until the accuracy does not improve compared to an accuracy of the prior iteration.

In another implementation of the foregoing computer-readable storage medium, the identifying the third set of features comprises iteratively (i) determining a measure of importance for different subsets of features within a set of features in a prior iteration, (ii) identifying subsets of features within the set of features in the prior iteration having a measure of importance that does not meet the threshold; (iii) replacing the identified subsets of features in the vectors with new features, and (iv) determining an accuracy of the ML model trained using the vectors, until at least one of a predetermined number of iterations has occurred, or a desired accuracy criteria has been satisfied.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for generating a machine learning (ML) model, comprising:
at least one processor circuit; and
at least one memory that stores program code configured to be executed by the at least one processor circuit, the program code comprising:
a vector budget determiner configured to:
access a plurality of vectors, each vector in the plurality of vectors comprising a first set of features associated with a corresponding data item, and identify a second set of features based at least on (i) expanding the first set of features included in each vector and (ii) determining that an accuracy of a ML model trained using the vectors has increased due to the expanding; and a vector budget allocator configured to:
  identify a third set of features by at least (i) determining a measure of importance for different subsets of features within the second set of features, (ii) identifying subsets of features within the second set of features having a measure of importance that does not meet a threshold; (iii) replacing the identified subsets of features in the vectors with new features, and (iv) determining that an accuracy of a ML model trained using the vectors has increased due to the replacing; and
  output a ML model trained using vectors that include the third set of features.

2. The system of claim 1, wherein the corresponding data item comprises one of:
  an email;
  a customer relationship management application-related message; or
  a support ticketing system-related message.

3. The system of claim 2, further comprising:
  a data item labeler that is configured to use the outputted ML model to classify a data item received subsequent to the training thereof.

4. The system of claim 1, wherein the first set of features comprises one or more fixed features and one or more extendable feature sets, and wherein the vector budget determiner is configured to expand the set of features included in each vector by expanding at least one of the extendable feature sets.

5. The system of claim 1, wherein each of the different subsets of features in the second set of features is generated by a different feature-generating algorithm, and wherein the vector budget allocator is configured to replace the identified subsets of features in the plurality of vectors with new features by:
  removing the identified subsets of features from the plurality of vectors, thereby removing a particular number of features from the plurality of vectors; and
  expanding one or more subsets of features in the plurality of vectors having a measure of importance that does meet the threshold, wherein the total amount of features added to the plurality of vectors by virtue of the expanding is equal to the particular number of features that were removed.

6. The system of claim 1, wherein the vector budget allocator is configured to determine the measure of importance for the different subsets of features within the second set of features by:
  determining a measure of importance for each of the different subsets of features in the second set of features relative to the other subsets of features in the second set of features.

7. The system of claim 1, wherein the vector budget determiner is configured to identify the second set of features by iteratively: (i) expanding a set of features included in each vector of the plurality of vectors in a prior iteration and (ii) determining an accuracy of a ML model trained using the plurality of vectors, until the accuracy does not improve compared to an accuracy of the prior iteration.

8. The system of claim 1, wherein the vector budget allocator is configured to identify the third set of features by iteratively: (i) determining a measure of importance for different subsets of features within a set of features in a prior iteration, (ii) identifying subsets of features within the set of features in the prior iteration having a measure of importance that does not meet the threshold, (iii) replacing, in the plurality of vectors of the prior iteration, the identified subsets of features within the set of features with new features, and (iv) determining an accuracy of the ML model trained using the vectors that include the third set of features, until at least one of a predetermined number of iterations has occurred, or a desired accuracy criteria has been satisfied.

9. A method for generating a machine learning (ML) model, comprising:
  accessing a plurality of vectors, each vector in the plurality of vectors comprising a first set of features associated with a corresponding data item;
  identifying a second set of features based at least on (i) expanding the first set of features included in each vector and (ii) determining that an accuracy of a ML model trained using the vectors has increased due to the expanding;
  identifying a third set of features by at least (i) determining a measure of importance for different subsets of features within the second set of features, (ii) identifying subsets of features within the second set of features having a measure of importance that does not meet a threshold, (iii) replacing the identified subsets of features in the vectors with new features, and (iv) determining that an accuracy of a ML model trained using the vectors has increased due to the replacing; and
  outputting a ML model trained using vectors that include the third set of features.

10. The method of claim 9, further comprising:
  using the outputted ML model to classify a data item received subsequent to the training thereof.

11. The method of claim 9, wherein the first set of features comprises one or more fixed features and one or more extendable feature sets, and wherein expanding the set of features included in each vector comprises expanding at least one of the extendable feature sets.

12. The method of claim 9, wherein each of the different subsets of features in the second set of features is generated by a different feature-generating algorithm, and wherein replacing the identified subsets of features in the plurality of vectors with new features comprises:
  removing the identified subsets of features from the plurality of vectors, thereby removing a particular number of features from the plurality of vectors; and
  expanding one or more subsets of features in the plurality of vectors having a measure of importance that does meet the threshold, wherein the total amount of features added to the plurality of vectors by virtue of the expanding is equal to the particular number of features that were removed.

13. The method of claim 9, wherein the identifying the second set of features comprises iteratively: (i) expanding a set of features included in each vector of the plurality of vectors in a prior iteration and (ii) determining an accuracy of a ML model trained using the plurality of vectors, until the accuracy does not improve compared to an accuracy of the prior iteration.

14. The method of claim 9, wherein the identifying the third set of features comprises iteratively (i) determining a measure of importance for different subsets of features within a set of features in a prior iteration, (ii) identifying subsets of features within the set of features in the prior iteration having a measure of importance that does not meet the threshold, (iii) replacing, in the plurality of vectors of the prior iteration, the identified subsets of features within the set of features with new features, and (iv) determining an accuracy of the ML model trained using the vectors that include the third set of features, until at least one of a predetermined number of iterations has occurred, or a desired accuracy criteria has been satisfied.

15. A computer-readable storage medium having program instructions recorded thereon that, when executed by at least one processor of a computing device, perform a method, the method comprising:

accessing a plurality of vectors, each vector in the plurality of vectors comprising a first set of features associated with a corresponding data item;

identifying a second set of features based at least on (i) expanding the first set of features included in each vector and (ii) determining that an accuracy of a machine learning (ML) model trained using the vectors has increased due to the expanding;

identifying a third set of features by at least (i) determining a measure of importance for different subsets of features within the second set of features, (ii) identifying subsets of features within the second set of features having a measure of importance that does not meet a threshold, (iii) replacing the identified subsets of features in the vectors with new features, and (iv) determining that an accuracy of a ML model trained using the vectors has increased due to the replacing; and outputting a ML model trained using vectors that include the third set of features.

16. The computer-readable storage medium of claim 15, wherein the method further comprises:

using the outputted ML model to classify a data item received subsequent to the training thereof.

17. The computer-readable storage medium of claim 15, wherein the first set of features comprises one or more fixed features and one or more extendable feature sets, and wherein expanding the set of features included in each vector comprises expanding at least one of the extendable feature sets.

18. The computer-readable storage medium of claim 15, wherein each of the different subsets of features in the second set of features is generated by a different feature-generating algorithm, and wherein replacing the identified subsets of features in the vectors with new features comprises:

removing the identified subsets of features from the plurality of vectors, thereby removing a particular number of features from the plurality of vectors; and expanding one or more subsets of features in the plurality of vectors having a measure of importance that does meet the threshold, wherein the total amount of features added to the plurality of vectors by virtue of the expanding is equal to the particular number of features that were removed.

19. The computer-readable storage medium of claim 15, wherein the identifying the second set of features comprises iteratively: (i) expanding a set of features included in each vector of the plurality of vectors in a prior iteration and (ii) determining an accuracy of a ML model trained using the plurality of vectors, until the accuracy does not improve compared to an accuracy of the prior iteration.

20. The computer-readable storage medium of claim 15, wherein the identifying the third set of features comprises iteratively (i) determining a measure of importance for different subsets of features within a set of features in a prior iteration, (ii) identifying subsets of features within the set of features in the prior iteration having a measure of importance that does not meet the threshold; (iii) replacing the identified subsets of features in the plurality of vectors with new features, and (iv) determining an accuracy of the ML model trained using the vectors that include the third set of features, until at least one of a predetermined number of iterations has occurred, or a desired accuracy criteria has been satisfied.

* * * * *